United States Patent
Coleman et al.

[11] Patent Number: 5,919,079
[45] Date of Patent: Jul. 6, 1999

[54] PLAY SWORD LOLLIPOP HOLDER

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 08/967,785

[22] Filed: Nov. 10, 1997

[51] Int. Cl.⁶ .......................... A63H 33/00; A63H 33/30
[52] U.S. Cl. ........................... 446/487; 446/473; 426/134
[58] Field of Search ............... 446/76, 473, 487, 446/236, 71, 81, 486, 489; 426/104, 134

[56] References Cited

U.S. PATENT DOCUMENTS

| | | | |
|---|---|---|---|
| 3,037,320 | 6/1962 | Powell | 446/473 |
| 5,209,692 | 5/1993 | Coleman et al. | 446/236 X |
| 5,391,107 | 2/1995 | Coleman | 446/71 X |
| 5,536,054 | 7/1996 | Liaw | 426/134 X |
| 5,675,988 | 10/1997 | Coleman et al. | 426/134 |
| 5,681,200 | 10/1997 | Schecter | 446/76 |
| 5,690,535 | 11/1997 | Coleman et al. | 426/134 X |
| 5,820,437 | 10/1998 | Coleman et al. | 446/81 X |

*Primary Examiner*—D Neal Muir
*Attorney, Agent, or Firm*—Melvin L. Crane Agent

[57] ABSTRACT

A play sword lollipop holding device for entertaining children. The device comprises a plastic handle which is the main housing with one or more plastic telescoping sleeves attached to the handle. The last sleeve, which is the smallest, has an aperture at the end to hold a lollipop on a stick. A child can enjoy playing and eating his/her play sword lollipop with the flick of their wrist. This action causes the telescoping sleeves and candy to extend outward from the handle making a sword to play with. When not in use, the telescoping sleeves collapse one into the other for easy carrying and storage.

1 Claim, 1 Drawing Sheet

PLAY SWORD LOLLIPOP HOLDER

This invention is directed to a play sword pop holder and more particularly to a telescoping play sword pop holder for the entertainment and use by children.

BACKGROUND OF THE INVENTION

Heretofore lollipop holders of different types have been patented by the inventors and others. Further, swords of different types have been provided as play toys for children. This invention is directed to a play toy in the form of a collapsible play sword to which a lollipop can be added to the outer end of the outermost extended sword part.

OBJECTS OF THE INVENTION

It is therefore an object of the invention to provide a play toy which can be used as a holder for a candy lollipop or for a play sword with or without a lollipop attached.

Another object is to provide a collapsible play sword which can be used as a holder for eating a candy lollipop or one which can be extended as a play sword as well as a sword which can be extended while consuming a candy lollipop.

Other objects and advantages will become obvious to those skilled in the art upon a review of the drawings and description of the drawings.

DESCRIPTION OF THE DEVICE

Figure 1:
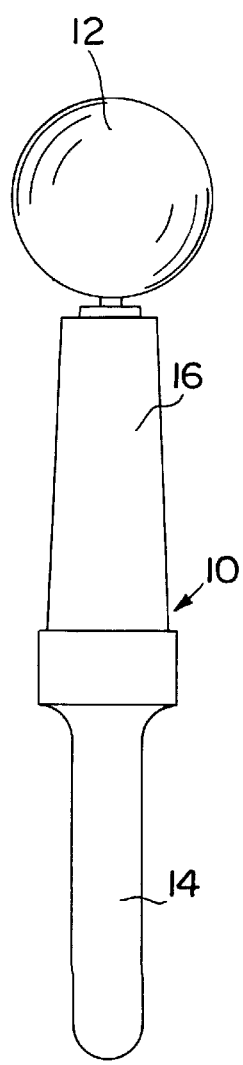
FIG. 1 is a side view of a sword-lollipop holder with the sword in a collapsed form.

Now referring to the drawings wherein like reference characters represent like parts throughout the different drawings, FIG. 1 illustrates a play sword 10 in a collapsed form with a lollipop 12 on one end of the play sword. As shown in FIG. 1, the play sword includes a handle 14 to which a fixed part 16 of a sword is secured or the handle can be secured to the fixed part of the sword.

Figure 2:
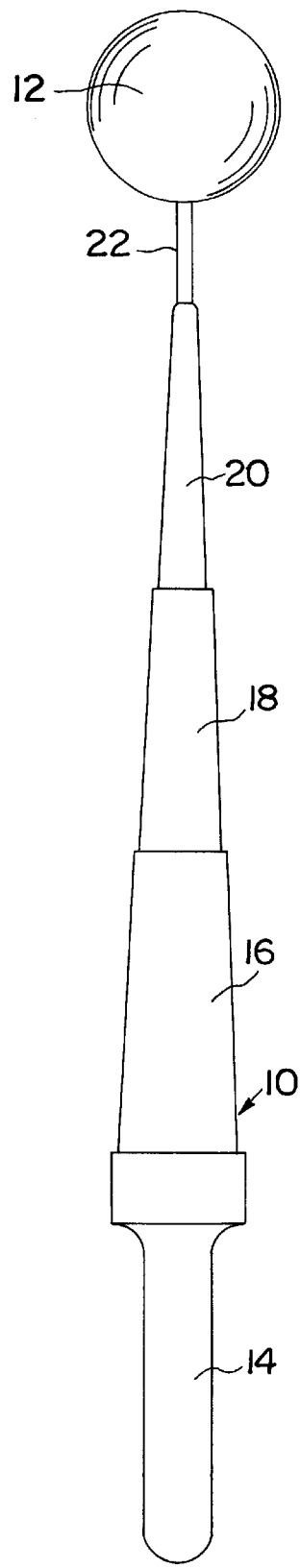
FIG. 2 is the sword-lollipop holder shown in FIG. 1 with the sword in a telescoped form.

FIG. 2 illustrates the sword in a telescoped form which shows the handle 14 to which the fixed section 16 of the sword is secured. As shown in FIG. 2, the sword includes two telescoping parts 18 and 20 and a lollipop stick 22. The telescoping parts 18 and 20 and the lollipop stick are not shown in FIG. 1.

Figure 3:
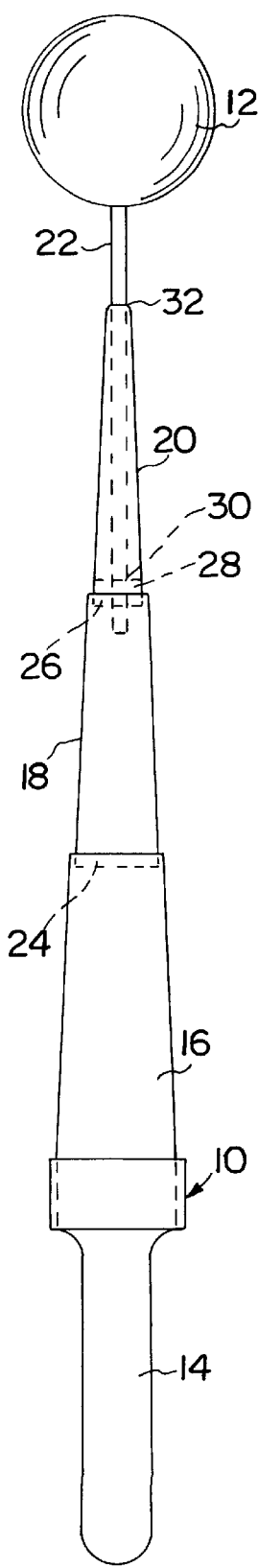
FIG. 3 illustrates the relative parts by dashed lines.

FIG. 3 illustrates the play sword in a telescoped form such as in FIG. 2; however, FIG. 3 illustrates flanges 24 and 26 formed at the ends of the telescoped parts to prevent the telescoped parts 18 and 20 from being pulled from the adjacent part. The flanges 24 and 26 have a larger diameter than the outer end of non-telescoping part 16 and telescoping part 18 to prevent the parts 18 and 20 from being forced from the adjacent sword parts. The flange 26 includes an end plug 28 which extends upwardly into the hollow end of telescoping part 20. The plug 28 has an axial aperture 30 which is provided to secure the bottom end of the lollipop stick 22 within the telescoping part 20. The upper end of the telescoping part 20 is also provided with an aperture 32 through which the lollipop stick extends in order to support the upper portion of the lollipop stick in the end of the telescoping part 20. It is obvious that the fixed part 16 and the telescoping parts 18 and 20 could have a fixed inner diameter along their length in order to support the telescoping parts as they are collapsed into the fixed part 16 and for guiding the lollipop stick as it is forced into aperture 30 of the end plug 28. The upper ends of parts 16 and 18 could be provided with a shoulder against which the flanges 24 and 26 would abut to prevent the telescoping parts 18 and 20 from being pulled from the adjacent parts.

FIG. 3 illustrates the end of fixed part 16 with dashed lines to represent that the lower end of part 16 is fixed to the handle 14. This could be done by matching screw threads or by glue. Obviously, in order to insert the telescoping parts to form the sword that part 20 must slide into part 18 and that part 18 must slide into part 16. This is done before assembly of the handle and part 16. Therefore, in order to prevent the part 16 from separating from the handle, the part 16 must be fixed to the handle or the handle must be fixed to the part.

The sword is shown with a handle 14, a fixed part 16, and two telescoping parts 18 and 20. It would be obvious to one skilled in the art that the sword could be made with less or more than two telescoping parts or even the sword could be one fixed part to which a lollipop is secured to the end.

The sword can be made of plastic or any other material without any sharp points or parts and should be made with a blunt end to prevent injury to anyone. With a telescoping sword, a child can learn to flick their wrist, which would cause the parts to telescope. As in fencing, a child could say "en garde", flick their wrist, and a collapsed sword would telescope to its length for fun play. The lollipop can be consumed and replaced by another lollipop. When not in use, the sword could be collapsed in order to store or carry the sword more easily.

The foregoing relates to preferred exemplary embodiments of the invention, it being understood that other variants and embodiments thereof are possible within the spirit and scope of the invention, the latter being defined by the appended claims.

We claim:

1. A play sword and lollipop device comprising
   a handle (14),
   a body part (16) fixed to one end of said handle,
   first and second telescoping parts (18, 20) that collapse into said body part (16) and which telescope therefrom,
   said first and second telescoping parts (18, 20) include a flange at one end that prevents said first and second telescoping parts from escaping from an adjacent sword part,
   said second telescoping part (20) includes an aperture in an outer end for reception of a lollipop stick to which a lollipop is secured, and
   said second telescoping part (20) includes a plug (30) in an end opposite from said aperture in said outer end for securing a lollipop stick within said second telescoping part (28) and securing one end of said lollipop stick in said plug (30).

* * * * *